(12) United States Patent
Nair

(10) Patent No.: US 8,588,306 B2
(45) Date of Patent: *Nov. 19, 2013

(54) TEMPORAL MOTION VECTOR FILTERING

(75) Inventor: Hari N. Nair, Bangalore (IN)

(73) Assignee: Tamiras Per Pte. Ltd., LLC, Dover, DE (US)

( * ) Notice: Subject to any disclaimer, the term of this patent is extended or adjusted under 35 U.S.C. 154(b) by 1381 days.

This patent is subject to a terminal disclaimer.

(21) Appl. No.: 12/264,478

(22) Filed: Nov. 4, 2008

(65) Prior Publication Data

US 2009/0116557 A1    May 7, 2009

Related U.S. Application Data

(63) Continuation of application No. 10/833,198, filed on Apr. 26, 2004, now Pat. No. 7,480,334.

(60) Provisional application No. 60/532,435, filed on Dec. 23, 2003.

(51) Int. Cl.
   *H04N 7/12*       (2006.01)
   *H04N 11/02*      (2006.01)
   *H04N 11/04*      (2006.01)
   *H04B 1/66*       (2006.01)

(52) U.S. Cl.
   USPC .................................... 375/240.16

(58) Field of Classification Search
   None
   See application file for complete search history.

(56) References Cited

U.S. PATENT DOCUMENTS

| | | | |
|---|---|---|---|
| 4,125,856 A | 11/1978 | Netravali | |
| 4,651,211 A | 3/1987 | Weckenbrock | |
| 4,652,907 A | 3/1987 | Fling | |
| 4,980,764 A | 12/1990 | Henot | |
| 5,259,040 A | 11/1993 | Hanna | |
| 5,311,306 A | 5/1994 | Tanaka | |
| 5,317,397 A | 5/1994 | Odaka | |
| 5,400,083 A | 3/1995 | Mizusawa | |
| 5,500,686 A | 3/1996 | Yamaguchi | |

(Continued)

FOREIGN PATENT DOCUMENTS

| CN | 1127906 | 7/1996 |
|---|---|---|
| EP | 0 242 935 A1 | 1/1987 |

(Continued)

OTHER PUBLICATIONS

Japanese Office Action mailed Mar. 29, 2011, issued in Japanese Application No. JP 2004-370682, filed Dec. 22, 2004, 3 pages.

(Continued)

*Primary Examiner* — Nhon Diep
(74) *Attorney, Agent, or Firm* — Christensen O'Connor Johnson Kindness PLLC

(57) ABSTRACT

Methods and apparatus, including computer program products, implementing and using techniques for performing temporal motion vector filtering in digital video are disclosed. A recursive hierarchical process is used to determine a motion vector. In the recursive hierarchical process, a neighborhood of old motion vectors is filtered to generate a first estimated motion vector for an image patch in a pair of two image frames. The filtering process uses multiple vectors in a neighborhood around the old motion vector to improve the prediction of the first estimated motion vector. The temporal vector partitioning process separates motion vectors associated with an object from motion vectors associated with a background before selecting a best motion vector, which improves the selection process. The process also works well in the absence of object/background boundaries, as in this case the outlier (incorrect) vector or vectors will be separated out from the good vectors.

26 Claims, 6 Drawing Sheets

(56) References Cited

U.S. PATENT DOCUMENTS

| | | |
|---|---|---|
| 5,519,438 A | 5/1996 | Elliott |
| 5,539,663 A | 7/1996 | Agarwal |
| 5,583,580 A | 12/1996 | Jung |
| 5,764,803 A | 6/1998 | Jacquin |
| 5,777,682 A | 7/1998 | De Haan |
| 5,786,872 A | 7/1998 | Miyazaki |
| 5,799,111 A | 8/1998 | Guissin |
| 5,819,035 A | 10/1998 | Devaney |
| 5,838,383 A | 11/1998 | Chimoto |
| 5,844,623 A | 12/1998 | Iwamura |
| 5,987,164 A | 11/1999 | Szeliski |
| 5,990,978 A | 11/1999 | Kim |
| 6,041,145 A | 3/2000 | Hayashi |
| 6,178,205 B1 | 1/2001 | Cheung |
| 6,178,265 B1 | 1/2001 | Haghighi |
| 6,236,763 B1 | 5/2001 | Wong |
| 6,246,827 B1 | 6/2001 | Strolle |
| 6,278,736 B1 | 8/2001 | De Haan |
| 6,300,985 B1 | 10/2001 | Lowe |
| 6,317,165 B1 | 11/2001 | Balram |
| 6,349,114 B1 | 2/2002 | Mory |
| 6,359,658 B1 | 3/2002 | He |
| 6,462,790 B1 | 10/2002 | Lowe |
| 6,658,059 B1 | 12/2003 | Iu |
| 6,674,488 B1 | 1/2004 | Satoh |
| 6,774,954 B1 | 8/2004 | Lee |
| 7,003,173 B2 | 2/2006 | Deshpande |
| 7,027,102 B2 | 4/2006 | Sacca |
| 7,046,306 B2 | 5/2006 | Zhai |
| 7,076,113 B2 | 7/2006 | Le Dinh |
| 7,203,237 B2 | 4/2007 | Fernandes |
| 7,274,408 B2 | 9/2007 | Shan |
| 7,324,163 B2 | 1/2008 | Bacche |
| 7,346,109 B2 | 3/2008 | Nair |
| 7,346,226 B2 | 3/2008 | Shyshkin |
| 7,349,033 B2 | 3/2008 | Chang |
| 7,457,438 B2 | 11/2008 | Nair |
| 7,480,334 B2 | 1/2009 | Nair |
| 7,499,494 B2 | 3/2009 | Nair |
| 7,535,515 B2 | 5/2009 | Bacche |
| 2002/0113901 A1 | 8/2002 | Osberger |
| 2002/0163595 A1 | 11/2002 | Adams |
| 2002/0163969 A1 | 11/2002 | Zhong |
| 2002/0191841 A1 | 12/2002 | Harman |
| 2002/0196362 A1 | 12/2002 | Yang |
| 2003/0072373 A1 | 4/2003 | Sun |
| 2003/0086498 A1 | 5/2003 | Lee |
| 2003/0152149 A1 | 8/2003 | Denolf |
| 2003/0156646 A1 | 8/2003 | Hsu |
| 2003/0194151 A1 | 10/2003 | Wang |
| 2004/0008777 A1 | 1/2004 | Swartz |
| 2004/0120401 A1 | 6/2004 | Linzer |
| 2004/0189875 A1 | 9/2004 | Zhai |
| 2004/0202250 A1 | 10/2004 | Kong |
| 2005/0013365 A1 | 1/2005 | Mukerjee |
| 2005/0013378 A1 | 1/2005 | Song |
| 2005/0128355 A1 | 6/2005 | Kang |
| 2005/0134740 A1 | 6/2005 | Bacche |
| 2005/0168650 A1 | 8/2005 | Walls |
| 2005/0276329 A1 | 12/2005 | Adiletta |
| 2006/0072790 A1 | 4/2006 | Wittebrood |
| 2006/0077306 A1 | 4/2006 | Suyambukesan |
| 2006/0232666 A1 | 10/2006 | Op De Beeck et al. |
| 2007/0092111 A1 | 4/2007 | Wittebrood |

FOREIGN PATENT DOCUMENTS

| | | | |
|---|---|---|---|
| EP | 0 294 956 | A2 | 12/1988 |
| EP | 0 376 330 | A2 | 7/1990 |
| EP | 0 466 981 | A1 | 1/1992 |
| EP | 0 772 365 | A2 | 5/1997 |
| EP | 0 849 950 | A2 | 6/1998 |
| EP | 1 117 251 | A1 | 7/2001 |
| EP | 1 549 048 | A2 | 6/2005 |
| EP | 1 587 328 | A2 | 10/2005 |
| GB | 2 286 740 | A | 8/1995 |
| GB | 2 311 183 | A | 9/1997 |
| JP | 01-318491 | A | 12/1989 |
| JP | 8-79760 | A | 3/1996 |
| JP | 08-163583 | A | 6/1996 |
| JP | 09-046726 | A | 2/1997 |
| JP | 2737146 | B2 | 1/1998 |
| JP | 10-233958 | A | 9/1998 |
| JP | 2942261 | B2 | 6/1999 |
| JP | 11-317943 | A | 11/1999 |
| JP | 2000-188680 | A | 7/2000 |
| JP | 3231309 | B2 | 9/2001 |
| WO | 87/05770 | A1 | 9/1987 |
| WO | 94/06098 | A1 | 3/1994 |
| WO | 99/60779 | A1 | 11/1999 |
| WO | 00/30359 | A1 | 5/2000 |
| WO | 00/54516 | A1 | 9/2000 |
| WO | 02/09611 | A2 | 2/2002 |
| WO | 02/19721 | A2 | 3/2002 |
| WO | 02/087210 | A2 | 10/2002 |
| WO | 03/007618 | A2 | 1/2003 |

OTHER PUBLICATIONS

Hiromatsu, T., et al., "Introduction to Statistics," 1st ed., Asakura Shoten, Ltd., Oct. 15, 1998, 9 pages.
European Office Action mailed Apr. 29, 2010, issued in European Application No. EP 04 258 046, filed Dec. 22, 2004, 5 pages.
European Office Action mailed May 18, 2010, issued in European Application No. EP 04 257 653.8, filed Dec. 14, 2004, 7 pages.
Chinese Office Action mailed Apr. 6, 2011, issued in Chinese Application No. CN 200810088727.4, filed Dec. 22, 2004, 4 pages.
Japanese Office Action mailed Feb. 22, 2011, issued in Japanese Application No. JP 2004-361159, filed Dec. 14, 2004, 11 pages.
Korean Office Action mailed Mar. 21, 2011, issued in Korean Application No. KR 10-2004-0100131, filed Dec. 2, 2004, 6 pages.
Korean Office Action mailed Mar. 30, 2011, issued in Korean Application No. KR 10-2004-0109975, filed Dec. 22, 2004, 6 pages.
Japanese Office Action mailed Oct. 4, 2010, issued in Japanese Application No. JP 2004-370682, filed Dec. 22, 2004, 3 pages.
Notice of Allowance mailed Nov. 10, 2010, issued in U.S. Appl. No. 12/257,204, filed Oct. 23, 2008, 28 pages.
Notice of Allowance mailed Mar. 29, 2011, issued in U.S. Appl. No. 12/257,204, filed Oct. 23, 2008, 11 pages.
European Office Action mailed Mar. 16, 2012, issued in EP 04 258 046.4, filed Dec. 22, 2004, 3 pages.
Chinese Office Action mailed Apr. 6, 2011, issued in Chinese Application No. CN 200810088727.4, filed Dec. 22, 2004, 7 pages.
Korean Office Action mailed Apr. 11, 2011, issued in Korean Application No. KR 110-2004-0100127, filed Dec. 2, 2004, 6 pages.
Japanese Office Action mailed Jun. 17, 2010, issued in corresponding Japanese Application No. JP 2004-369568, filed Dec. 21, 2004, 3 pages.
"Basic Statistics," in Chikio Hayashi (ed.), Apr. 25, 1991, Asakura Book Co., pp. 76-77, no translation.
Japanese Office Action mailed Jul. 19, 2011, issued in Japanese Application No. JP 2004-361159, filed Dec. 14, 2004, 6 pages, no translation.
Japanese Office Action mailed Apr. 8, 2011, issued in Japanese Application No. JP 2004-369568, filed Dec. 21, 2004, 7 pages.
Taiwanese Office Action mailed May 20, 2011, issued in Taiwanese Application No. TW 093140046, filed Dec. 22, 2004, 14 pages.
Australian Patent Office Search Report mailed Feb. 2, 2006, issued in Singapore Patent Application No. 200406853-2, filed Nov. 24, 2004, which corresponds to U.S. Patent No. 7,346,109, issued Mar. 18, 2008, 6 pages.
Australian Patent Office Search Report mailed Feb. 8, 2006, issued in corresponding Singapore Application No. SG 200406862-3, filed Nov. 24, 2004, 4 pages.
Australian Patent Office Written Opinion mailed Feb. 14, 2006, issued in Singapore Application No. SG200407681-6, which corresponds to U.S. Patent No. 7,535,515, issued May 19, 2009, 5 pages.

(56) References Cited

OTHER PUBLICATIONS

Australian Patent Office Search Report mailed Feb. 14, 2006, issued in Singapore Application No. SG 400407681-6, filed Dec. 23, 2004, which corresponds to U.S. Patent No. 7,535,515, issued May 19, 2009, 4 pages.
Australian Patent Office Examination Report mailed May 18, 2007, issued in Singapore Application No. SG 200406810-2, filed Nov. 22, 2004, which corresponds to U.S. Patent No. 7,346,226, issued Mar. 18, 2008, 4 pages.
Australian Patent Office Search Report and Written Opinion mailed May 31, 2006, issued in Singapore Application No. SG 200406810-2, filed Nov. 22, 2004, which corresponds to U.S. Patent No. 7,346,226, issued Mar. 18, 2008, 6 pages.
Danish Patent & Trademark Office Examination Report mailed Mar. 23, 2007, issued in Singapore Application No. SG 200407680-8, filed Nov. 22, 2004, which corresponds to U.S. Patent No. 7,457,438, issued Nov. 25, 2008, 9 pages.
European Examination Report mailed Sep. 11, 2006, issued in European Patent Application No. EP 04 25 7653.8, filed Dec. 14, 2004, which corresponds to U.S. Patent No. 7,346,226, issued Mar. 18, 2008, 8 pages.
European Examination Report mailed Nov. 12, 2007, issued in corresponding European Patent Application No. EP 04 257 854.2, filed Dec. 16, 2004, 5 pages.
European Examination Report mailed Nov. 13, 2007, issued in European Patent Application No. EP 04 257 855.9, filed Dec. 16, 2004, which corresponds to U.S. Patent No. 7,346,109, issued Mar. 18, 2008, 2 pages.
European Patent Office Search Report mailed Jun. 1, 2005, issued in European Patent Application No. EP 04 25 8048.0, filed Dec. 22, 2004, which corresponds to U.S. Patent No. 7,535,515, issued May 19, 2009, 3 pages.
European Patent Office Search Report mailed Jan. 12, 2006, issued in European Patent Application No. EP 04 25 7855.9, filed Dec. 16, 2004, which corresponds to U.S. Patent No. 7,346,109, issued Mar. 18, 2009, 3 pages.
European Patent Office Search Report mailed Jan. 17, 2006, issued in European Patent Application No. EP 04 25 8046, filed Dec. 22, 2004, which corresponds to U.S. Patent No. 7,457,438, issued Nov. 25, 2008, 4 pages.
European Patent Office Search Report mailed Apr. 11, 2006, issued in European Patent Application No. EP 04 25 7653.8, filed Dec. 14, 2004, which corresponds to U.S. Patent No. 7,346,226, issued Mar. 18, 2008, 4 pages.
European Patent Office Search Report mailed Apr. 13, 2006, issued in European Patent Application No. EP 04 25 7854.2, filed Dec. 16, 2004, 3 pages.
European Patent Office Search Report mailed Sep. 17, 2008, issued in European Patent Application No. EP 05 25 6353.3, filed Oct. 13, 2005, which corresponds to U.S. Patent No. 7,324,163, issued Jan. 29, 2008, 6 pages.
Examination Report mailed Sep. 28, 2006, issued in Singapore Application No. SG 200506302-9, filed Sep. 29, 2005, which corresponds to U.S. Patent No. 7,324,163, issued Jan. 29, 2008, 4 pages.
First Office Action mailed Aug. 17, 2007, issued in corresponding Chinese Application No. CN 200410102089.9, filed Dec. 22, 2004, 13 pages.
First Office Action mailed Aug. 24, 2007, issued in corresponding Chinese Application No. CN 200410102094.X, filed Dec. 22, 2004, 7 pages.
Office Action mailed Nov. 6, 2007, issued in U.S. Appl. No. 10/868,169, filed Oct. 7, 2004, 13 pages.
Office Action mailed Dec. 13, 2007, issued in U.S. Appl. No. 10/866,460, filed Jun. 10, 2004, 5 pages.
Office Action mailed Jan. 15, 2008, issued in corresponding U.S. Appl. No. 10/833,198, filed Apr. 26, 2004, 7 pages.
Office Action mailed Apr. 22, 2008, issued in U.S. Appl. No. 10/868,169, filed Oct. 7, 2004, 15 pages.
Office Action mailed May 6, 2008, issued in U.S. Appl. No. 10/866,460, filed Jun. 10, 2004, 6 pages.
Office Action mailed Jun. 26, 2008, issued in corresponding U.S. Appl. No. 10/833,198, filed Apr. 26, 2004, 7 pages.
Search Report mailed Sep. 28, 2006, issued in Singapore Application No. SG 200506302-9, filed Sep. 29, 2005, which corresponds to U.S. Patent No. 7,324,163, issued Jan. 29, 2008, 4 pages.
Bellers, E. B., and G. De Haan, "Advanced De-Interlacing Techniques," Proceedings of the ProRISC/IEEE Workshop on Circuits, Systems and Signal Processing, Mierlo, Netherlands, Nov. 1996, pp. 1-13.
Braun, M., et al., "Motion-Compensating Real-Time Format Converter for Video on Multimedia Displays," Proceedings of the IEEE 4th International Conference on Image Processing (ICIP '97), Washington, D.C., Oct. 26-29, 1997, vol. 1, pp. 125-128.
Choi, S.-U., et al., "Motion Adaptive 3D Y/C Separation Algorithm Using Motion Estimation and Motion Compensation," IEEE Transactions on Consumer Electronics 47(4):770-778, Nov. 2001.
De Haan, G., "IC for Motion Compensated De-Interlacing, Noise Reduction, and Picture Rate Conversion," Digest of Technical Papers: IEEE International Conference on Consumer Electronics (ICCE), Los Angeles, Jun. 22-24, 1999, pp. 212-213.
De Haan, G., and E. B. Bellers, "De-Interlacing of Video Data," IEEE Transactions on Consumer Electronics 43(3):819-825, Aug. 1997.
De Haan, G., and R. J. Schutten, "Real-Time 2-3 Pull-Down Elimination Applying Motion Estimation/Compensation in a Programmable Device," Digest of Technical Papers: IEEE International Conference on Consumer Electronics (ICCE), Jun. 2-4, 1998, pp. 356-357.
De Haan, G., et al., "Television Noise Reduction IC," IEEE Transactions on Consumer Electronics 44(1):143-154, Feb. 1998.
Delogne, P., et al., "Improved Interpolation, Motion Estimation, and Compensation for Interlaced Pictures," IEEE Transactions on Image Processing 3(5):482-491, Sep. 1994.
Gu, Q. S., et al., "IIR Digital Filters for Sampling Structure Conversion and Deinterlacing of Video Signals," Proceedings of the IEEE International Symposium on Circuits and Systems (ISCAS '95), Seattle, Apr. 28-May 3, 1995, vol. 2, pp. 973-976.
Jostschulte, K., et al., "A Subband Based Spatio-Temporal Noise Reduction Technique for Interlaced Video Signals," Digest of Technical Papers: IEEE International Conference on Consumer Electronics (ICCE), Los Angeles, Jun. 2-4, 1998, pp. 438-439.
Jostschulte, K., et al., "Perception Adaptive Temporal TV-Noise Reduction Using Contour Preserving Prefilter Techniques," IEEE Transactions on Consumer Electronics 44(3):1091-1096, Aug. 1998.
Kalevo, O., and P. Haavisto, "Deinterlacing of Video Signals Using Nonlinear Interpolation With Simple Motion Compensation," Proceedings of the IEEE Winter Workshop on Nonlinear Digital Signal Processing, Jan. 17-20, 1993, pp. 4.1-4.6.
Kalevo, O., and P. Haavisto, "Motion Compensated Deinterlacing," Digest of Technical Papers: IEEE International Conference on Consumer Electronics (ICCE), Rosemont, Ill., Jun. 8-10, 1993, pp. 40-41.
Kovačević, J., et al., "Deinterlacing by Successive Approximation," IEEE Transactions on Image Processing 6(2):339-344, Feb. 1997.
Kwon, O., et al., "Deinterlacing Using Directional Interpolation and Motion Compensation," IEEE Transactions on Consumer Electronics 49(1):198-203, Feb. 2003.
Liang, Y., "Phase-Correlation Motion Estimation," Digital Video Processing (EE 392J): Student Final Project, Stanford University, Palo Alto, Calif., Winter 2000, pp. 1-9.
Migliorati, P., and S. Tubaro, "Multistage Motion Estimation for Image Interpolation," Signal Processing: Image Communication 7(3):187-199, Sep. 1995.
Oh, H.-S., et al., "Spatio-Temporal Edge-Based Median Filtering for Deinterlacing," Digest of Technical Papers: IEEE International Conference on Consumer Electronics (ICCE), Los Angeles, Jun. 13-15, 2000, pp. 52-53.
Ohm, J.-R., and K. Rümmler, "Variable-Raster Multiresolution Video Processing With Motion Compensation Techniques," Proceedings of the IEEE 4th International Conference on Image Processing (ICIP '97), Washington, D.C., Oct. 26-29, 1997, vol. 1, pp. 759-762.
Park, J.-I., and C. W. Lee, "Robust Estimation of Camera Parameters From Image Sequence for Video Composition," Signal Processing: Image Communication 9(1):43-53, Nov. 1996.

(56) References Cited

OTHER PUBLICATIONS

Patti, A. J., et al., "A New Motion-Compensated Reduced-Order Model Kalman Filter for Space-Varying Restoration of Progressive and Interlaced Video," IEEE Transactions on Image Processing 7(4):543-554, Apr. 1998.

Ryu, C., and S. P. Kim, "Deinterlacing Using Motion Compensated Local Spectra," Proceedings of the 29th Asilomar Conference on Signals, Systems and Computers, Pacific Grove, Calif., Oct. 30-Nov. 2, 1995, vol. 2, pp. 1394-1397.

Schu, M., et al., "System on Silicon—IC for Motion Compensated Scan Rate Conversion, Picture-in-Picture Processing, Split Screen Applications and Display Processing," IEEE Transactions on Consumer Electronics 45(3):842-850, 1999.

Sun, C., "De-Interlacing of Video Images Using a Shortest Path Technique," IEEE Transactions on Consumer Electronics 47(2):225-230, May 2001.

Thomas, G. A., "A Comparison of Motion-Compensated Interlace-to-Progressive Conversion Methods," BBC Research and Development Report (BBC RD Sep. 1996), 1996, 18 pages.

Vandendorpe, L., et al., "Generalized Interpolators for Advanced Movement-Compensated 50HZ—60HZ Conversion of Interlaced Sequences," Proceedings of the IEEE 4th International Conference on Image Processing (ICIP '95), Washington, D.C., Oct. 22-26, 1997, vol. 2, pp. 237-240.

Vella, F., et al., "Digital Image Stabilization by Adaptive Block Motion Vectors Filtering," IEEE Transactions on Consumer Electronics 48(3):796-801, Aug. 2002.

Yang, S., et al., "Low Bit Rate Video Sequence Coding Artifact Removal," Proceedings of the IEEE 4th Workshop on Multimedia Signal Processing, Cannes, France, Oct. 3-5, 2001, pp. 53-58.

Yuen, M., and H. R. Wu, "A Survey of Hybrid MC/DPCM/DCT Video Coding Distortions," Signal Processing 70(3):247-278, Nov. 1998.

Office Action mailed Jan. 6, 2010, issued in U.S. Appl. No. 12/257,204, filed Oct. 23, 2008, 9 pages.

Final Office Action mailed May 26, 2010, issued in U.S. Appl. No. 12/257,204, filed Oct. 23, 2008, 15 pages.

Office Action mailed Apr. 24, 2008, issued in U.S. Appl. No. 10/986,518, filed Nov. 10, 2004, 12 pages.

Final Office Action mailed Oct. 8, 2008, issued in U.S. Appl. No. 10/986,518, filed Nov. 10, 2004, 7 pages.

Japanese Office Action mailed Jun. 28, 2010, issued in Japanese Application No. JP 2004-370666, filed Dec. 22, 2004, which corresponds to U.S. Patent No. 7,457,438, issued Nov. 25, 2008, 4 pages.

Office Action mailed Aug. 30, 2012, issued in U.S. Appl. No. 11/924,463, filed Oct. 25, 2007, 17 pages.

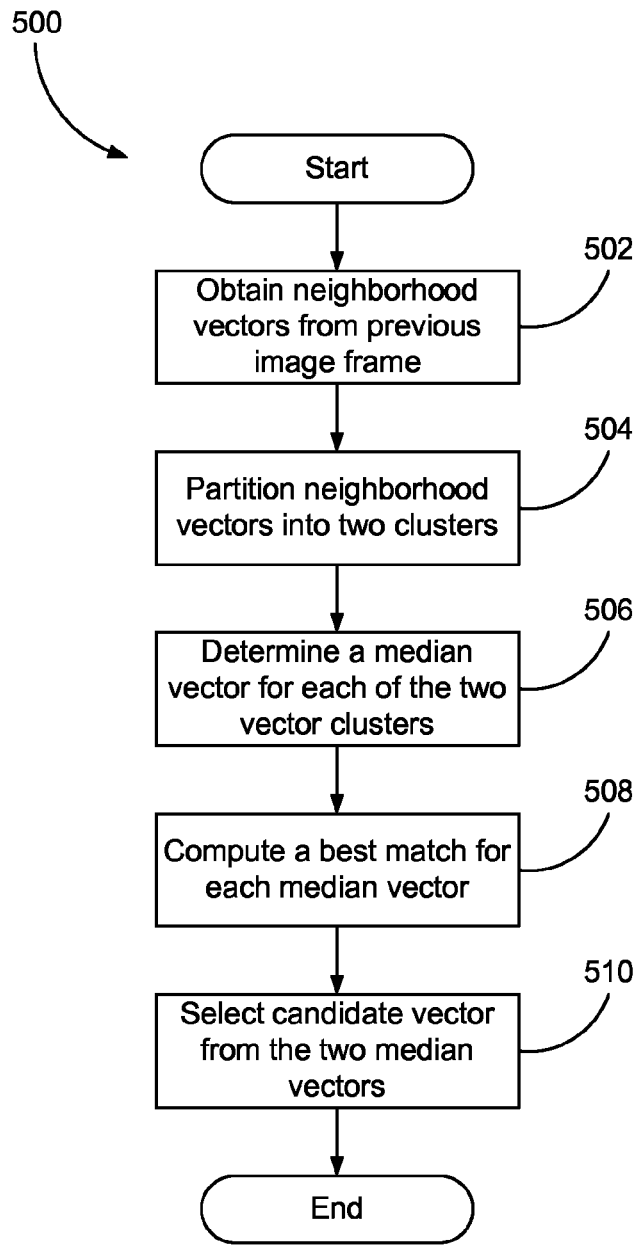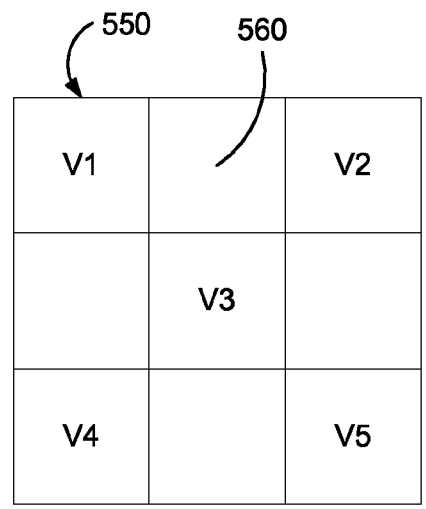
FIG. 5A
FIG. 5B

TEMPORAL MOTION VECTOR FILTERING

CROSS-REFERENCE TO RELATED APPLICATIONS

This application is a continuation of and claims the benefit of priority from U.S. patent application Ser. No. 10/833,198 filed Apr. 26, 2004, which, in turn, claims the benefit of priority from U.S. Provisional Patent Application No. 60/532,435, filed Dec. 23, 2003, all of which are hereby incorporated by reference herein in their entirety.

BACKGROUND

This invention relates to improving video and graphics processing.

At low display refresh rates (for example, 50 fields/sec for interlaced video material, and 24 frames/sec for film-originated material) on progressive digital display devices, a display artifact referred to as "area flicker" can occur. The area flicker becomes more visible as the size of the display increases, due to the high sensitivity to flicker in the human visual peripheral region. A simple solution for reducing the area flicker is to increase the display refresh rate by repeating the input fields or frames at a higher rate (for example, 100 fields/sec for interlaced video). This solves the area flicker problem for static scenes. However, the repetition introduces a new artifact in scenes with motion, known as "motion judder" or "motion smear," particularly in areas with high contrast, due to the human eye's tendency to track the trajectory of moving objects. For this reason, motion compensated frame interpolation is preferred, in which the pixels are computed in an interpolated frame or field at an intermediate point on a local motion trajectory, so that there is no discrepancy between an expected image motion due to eye tracking and a displayed image motion. The local image motion trajectory from one field or frame to the next is described by a motion vector.

Motion vectors can be computed at different levels of spatial resolution, such as at a pixel level, at an image patch level, or at an object level. Computing a motion vector for every pixel independently would theoretically result in an ideal data set, but is unfeasible due to the large number of computations required. Computing a motion vector for each image patch reduces the number of computations, but can result in artifacts due to motion vector discontinuities within an image patch. Computing motion vectors on an object basis can theoretically result in high resolution and lower computational requirements, but object segmentation is a challenging problem.

Therefore what is needed is a way to determine motion vectors efficiently and accurately, such that little or no discrepancy exists between an expected image motion due to eye tracking and a displayed image motion in a digital video.

SUMMARY

The present invention provides methods and apparatus for determining motion vectors efficiently and accurately, such that little or no discrepancy exists between an expected image motion due to eye tracking and a displayed image motion in a digital video.

In general, in one aspect, the invention provides methods and apparatus, including computer program products, implementing and using techniques for performing temporal motion vector filtering in a digital video sequence. Several vectors are received, the vectors representing potential motion vectors for an image patch including one or more of an object and a background. The vectors are partitioned into two or more vector clusters. A representative vector is determined for each vector cluster. Each representative vector is tested to determine which representative vector most accurately reflects a displacement of the image patch between a first frame and a second frame of the digital video. The representative vector that most accurately reflects the displacement of the image patch is selected as a motion vector.

Advantageous implementations can include one or more of the following features. Partitioning can include determining a first seed vector for a first cluster and a second seed vector for a second cluster by identifying two vectors among the vectors that are furthest apart from each other, and for every other vector, placing the vector into the first cluster if the vector is closest to the first seed vector, and placing the vector into the second cluster if the vector is closest to the second seed vector. Determining a representative vector can include for each cluster, determining which vector in the cluster has a minimum total distance from all the other vectors in the cluster. Each cluster can represent an object or a background in the digital video. Each image patch can include several pixels. One vector can represent an old motion vector originating at a first pixel and ending at a second pixel, and the other vectors originate at the first pixel and end at pixels different from the second pixel in a horizontal direction or a vertical direction. The size of each image patch can be 8 by 8 pixels.

Testing each representative vector can include, for each representative vector, centering a first window on a pixel that forms an origin of the representative vector, centering a second window on a pixel that forms an end point of the representative vector, determining a sum of absolute differences of luma values for the pixels in the first window and pixels at corresponding positions in the second window, and selecting as the representative vector which most accurately reflects a displacement of the image patch, the representative vector that has a minimum sum of absolute differences. The dimensions of the first and second windows can be identical to the dimensions of the image patch.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 5A shows a flowchart of a process for performing temporal vector partitioning.

FIG. 5B shows an exemplary set of neighborhood vectors that can be used in a temporal vector partitioning process.

Like reference symbols in the various drawings indicate like elements.

DETAILED DESCRIPTION OF THE INVENTION

The present invention provides methods and apparatus for determining motion vectors efficiently and accurately, such that little or no discrepancy exists between an expected image motion due to eye tracking and a displayed image motion in a digital video. This is accomplished by using a recursive hierarchical approach including a temporal vector partitioning scheme to determine motion vectors.

Generally, for motion compensated approaches to work well, including the recursive hierarchical approach described herein, two basic assumptions are made about the nature of the object motion: 1) moving objects have inertia, and 2) moving objects are large. The inertia assumption implies that a motion vector changes only gradually with respect to a temporal vector sampling interval (that is, the frame rate in the digital video). The large objects assumption implies that a motion vector changes only gradually with respect to a spatial vector sampling interval, that is, the vector field is smooth and has only few boundary motion discontinuities.

The goal of the recursive hierarchical method is to find a motion vector by applying a source correlation window to a first image frame and a target correlation window to a subsequent image frame, and placing the target correlation window such that a best match with the source correlation window is obtained, that is, the contents of the source correlation window and target correlation window are as similar as possible. At the same time, the number of calculations needed to perform the matching between the source correlation window and the target correlation window must be as low as possible, while still searching the entire vector space limit. In order to accomplish these goals, the recursive hierarchical method uses multiple resolution levels of the image frames. A best motion vector is first determined for the lowest resolution level by projecting the previous best motion vector at the highest resolution level down to the lowest resolution level, and testing it and one or more updates. This best motion vector is then propagated up to a higher resolution level, where some adjustments are made and a new best motion vector is determined. This new best motion vector is propagated up to yet another higher resolution level, where more adjustments are made and another new best motion vector is determined. This process is repeated until the highest, original, resolution level has been reached and a best motion vector has been identified for the original resolution level.

Figure 1:
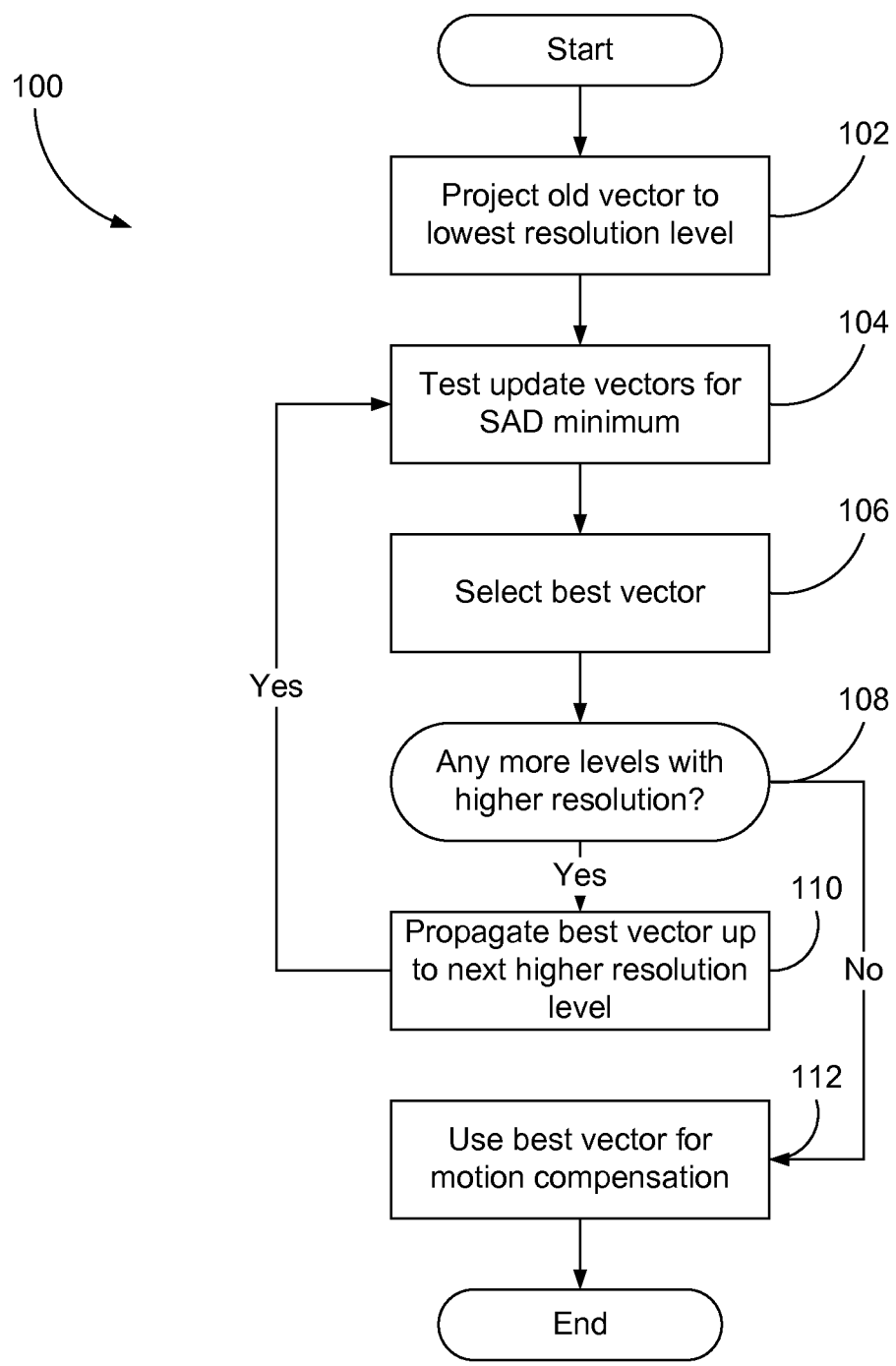
FIG. 1 shows a flowchart of a recursive hierarchical process for determining a motion vector.

FIG. 1 shows one implementation of a recursive hierarchical process (100). It is assumed that multiple resolution levels of the image frames have already been generated. As can be seen in FIG. 1, the recursive hierarchical process (100) for determining a motion vector starts by projecting a motion vector from a previous image frame down to a lowest resolution level (step 102). A set of update vectors is generated and tested to find a best motion vector at this lowest resolution level (step 104). In one implementation this test is performed by comparing pixels in corresponding positions in a source correlation window centered on the origin of the motion vector and a target correlation window centered on the end point of each respective update vector. The comparison can, for example, be performed by subtracting a luma value for each pixel in the source window from the corresponding pixel in the respective target windows. In this case the best match would be defined by finding a minimum sum of absolute differences (SAD) for a source correlation window and a target correlation window pair, and the best motion vector would be the vector associated with this source correlation window and a target correlation window pair.

After the minimum SAD has been found, the best vector is selected (step 106). The process (100) then examines whether there are any higher resolution levels (step 108). If there are higher resolution levels, the process propagates the best vector up to the next higher resolution level (step 110) and repeats steps 104 through 108. If there are no higher resolution levels, the process proceeds to step 112, where the best vector is selected as the motion vector and is used for motion compensation, which completes the process for the current frame.

The advantage of this approach is that at a lower level, an update of a pixel is equivalent to an update of two or more pixels at the next higher level, depending on the difference in resolution between the two levels. If there are, for example, three resolution levels, say 1:1, 1:2 and 1:4, and an update of +/−1 pixel at each level, the convergence delay is potentially reduced by a factor of four. Expressed differently, effectively the resolution hierarchy is used to accelerate the temporal recursion convergence. This results in significant improvements, in particular for frames containing small objects moving with high velocities.

The invention will now be explained in greater detail, by way of example of a recursive hierarchical scheme with three levels of resolution at 1:1, 1:2, and 1:4, with an image patch grid of 4×4 pixels, and with reference to FIGS. 1-4. It should be noted that the vectors shown in FIGS. 2-4 are representative only of this example, and that the number of resolution levels and the number and/or the types of vectors at each resolution level can be varied depending on various factors, such as computational cost, quality, processing speed, and so on.

Figure 3:
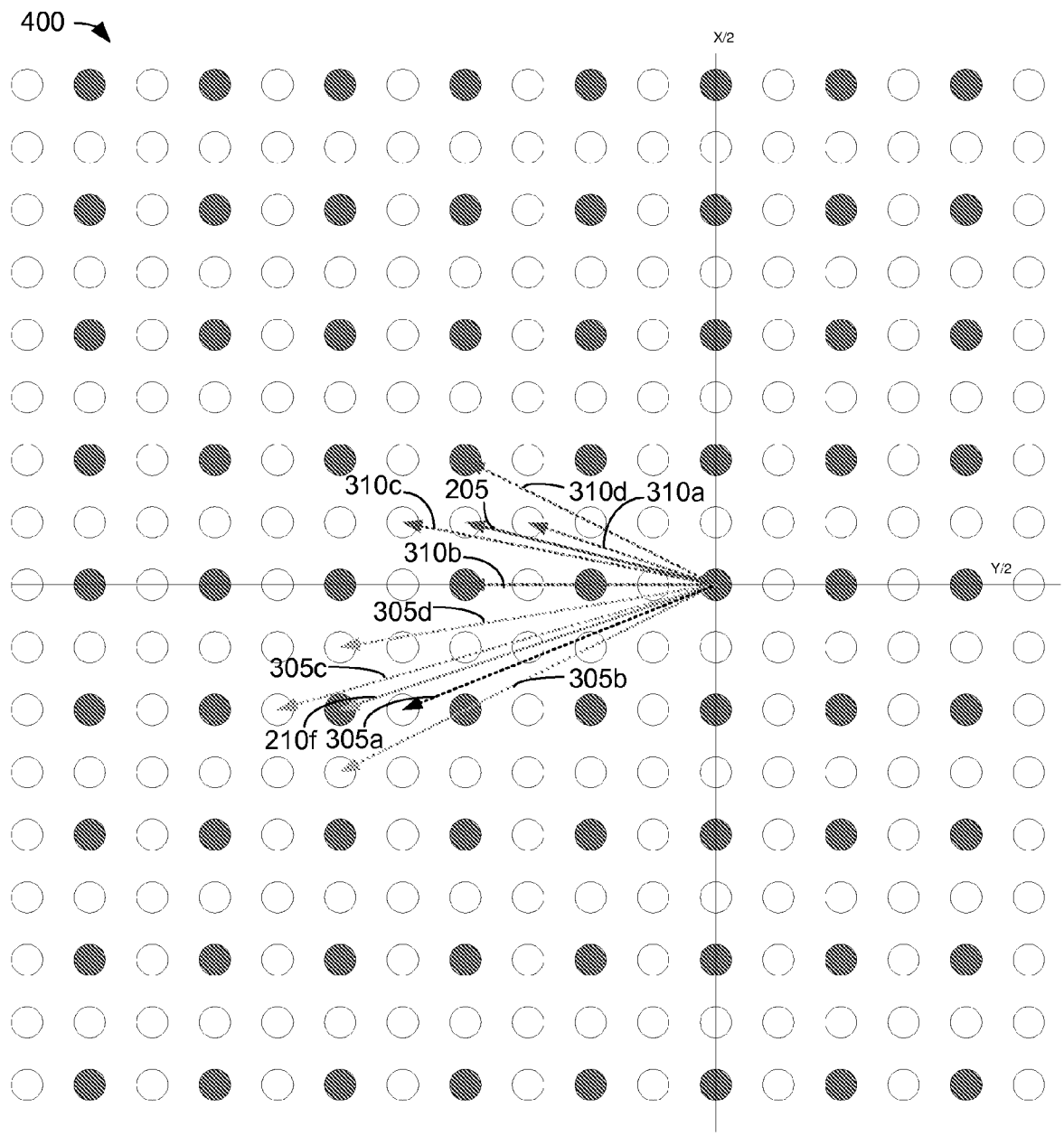
FIG. 3 shows an example of vectors for determining a best motion vector at a resolution of 1:2 of an original resolution of a video frame.
Figure 4:
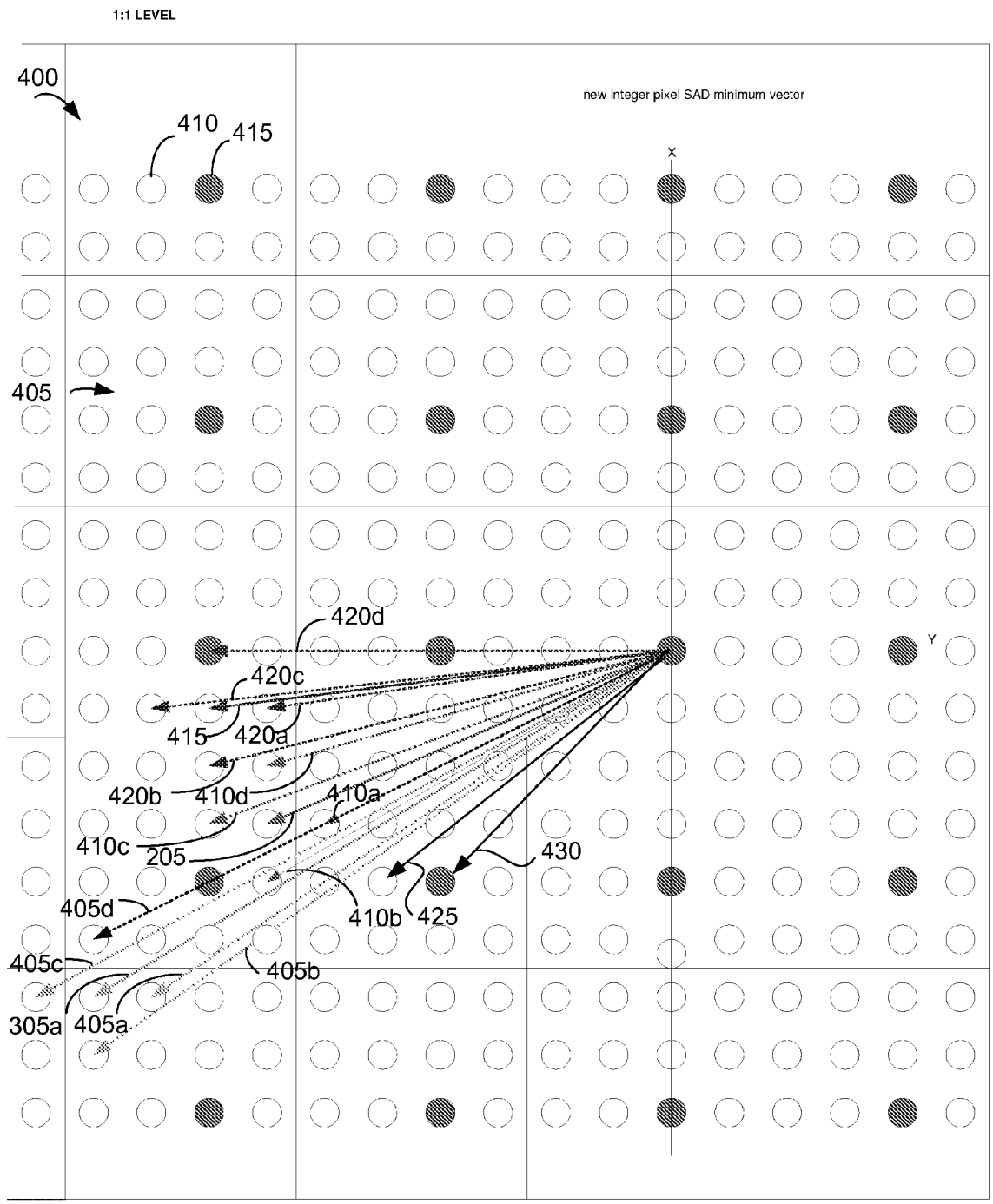
FIG. 4 shows an example of vectors for determining a best motion vector at an original resolution of a video frame.

FIG. 4 shows an image patch grid (400), which is divided into image patches (405) of 4×4 pixels, where each pixel is illustrated as a circle (410). The dark pixels (415) indicate locations at which motion vectors are computed for each 4×4 image patch of pixels. As can be seen in FIG. 4, one motion vector is computed for each 4×4 image patch of pixels and the locations within each 4×4 image patch of the motion vectors' origins are the same. FIG. 3 shows the same pixel grid (400) at half the resolution of the original pixel grid of FIG. 4. FIG. 2 shows the same pixel grid (400) at the lowest resolution, which in the present example is half the resolution of FIG. 3, or a fourth of the resolution of FIG. 4.

Figure 2:
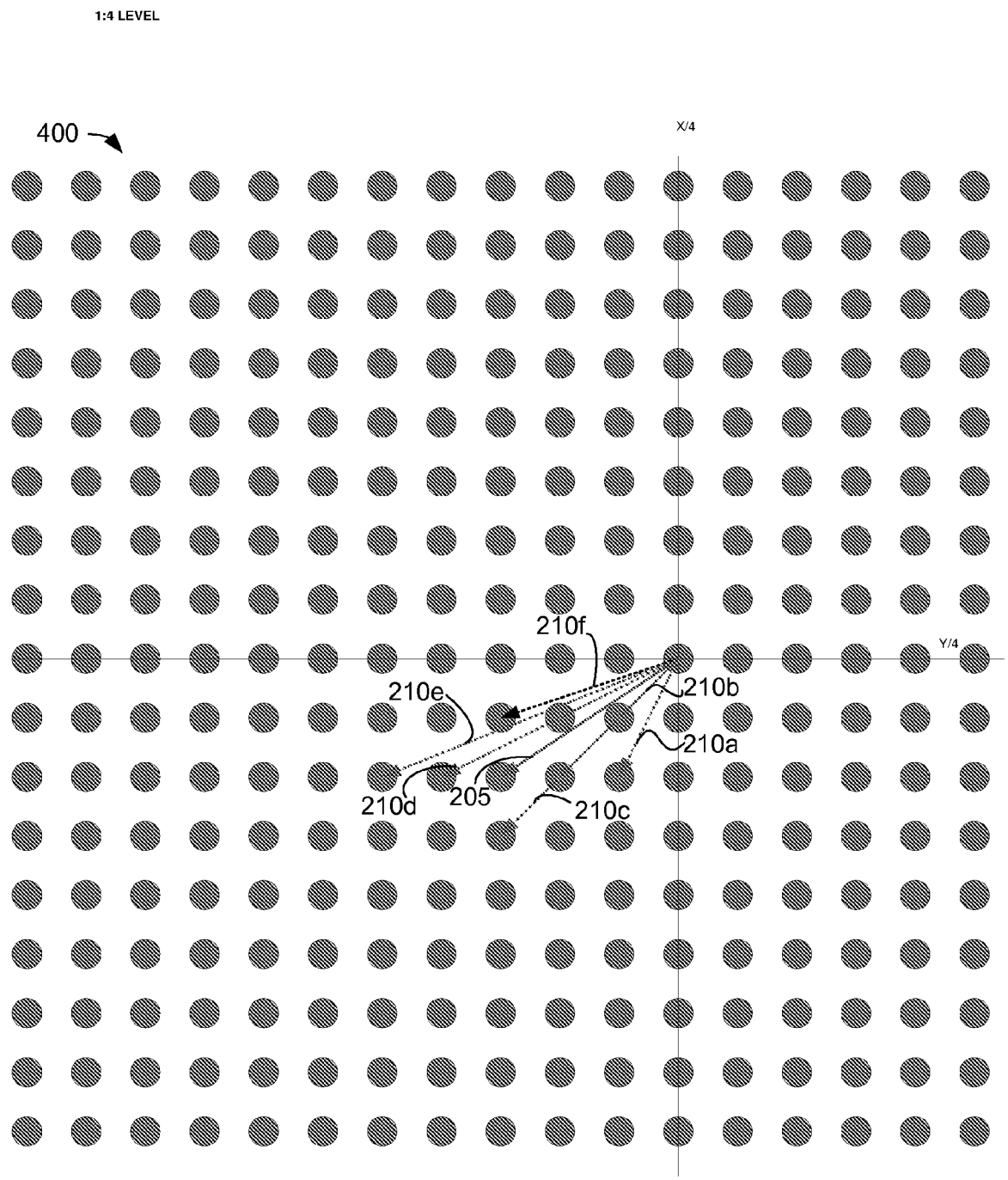
FIG. 2 shows an example of vectors for determining a best motion vector at a resolution of 1:4 of an original resolution of a video frame.

As shown in FIG. 1 and FIG. 2, a recursive hierarchical process for determining a motion vector starts by projecting a motion vector (205) from a previous image down to a lowest resolution level (step 102), which in the present example is 1:4 of the original resolution, and is illustrated in FIG. 2. In one implementation the old motion vector (205) is filtered before it is projected, primarily to take care of cases in which the neighborhood contains an object-background boundary that causes a discontinuity in the vectors. This process is also referred to as temporal vector partitioning and will be explained in further detail below. The filtered output is a new base vector at the 1:1 level, which is subsequently projected down to 1:4 level. In the first frame of a sequence, that is, when there is no previous image, the process (100) starts with a zero vector as the old motion vector. In one implementation, the zero vector is also used when there is a scene break in the video, that is, when there is no continuity between two frames.

FIG. 5A shows one implementation of a temporal vector partitioning process (500). As was described above, the purpose of the temporal vector partitioning process (500) is to give a better estimation of an old motion vector (205) to be projected to the lowest resolution level, as shown in FIG. 2.

Therefore, rather than simply projecting a single motion vector, a neighborhood (550) including multiple vectors, as shown in FIG. 5B, is examined. Furthermore, it is assumed that the neighborhood of vectors (550) includes an object/background boundary. The temporal vector partitioning process (500) attempts to separate motion vectors associated with an object from motion vectors associated with a background before selecting a best motion vector, which further improves the selection process.

As can be seen in FIG. 5A, the process (500) starts with obtaining a set of neighborhood vectors (550) from a previous image frame. The set (550) shown in FIG. 5B includes nine vectors, each pointing to an image patch (560). In the present example, nine adjacent image patches (560) are used to define the neighborhood vectors, but only five of them (V1 through V5, arranged in an X-shaped pattern) are used for the computations in the implementation described herein. However, the reader should realize that any number of vectors can be selected, and that the neighborhood can have many different shapes. The set of five neighborhood vectors and a square shaped set of image patches (560) are only used herein for exemplary purposes.

The process then partitions the set of neighborhood vectors (550) into two clusters (step 504). In one implementation, the partitioning is performed by determining which two vectors are furthest apart from each other and using these two vectors as seeds for the two clusters. After the two seed vectors for the clusters have been determined, each remaining vector is sorted into one of the two clusters, based on which cluster seed vector they are closest to.

Next, the process determines a representative vector for each cluster (step 506). The purpose of determining representative vectors is to find existing vectors that are the best representatives for the respective clusters. In one implementation, the representative vectors are determined as the vectors that have the minimum distances from all the other vectors in their respective cluster. The minimum distance can, for example, be calculated by determining a distance from each vector in a cluster to all other vectors in the same cluster and adding the distances. The vector with the minimum total distance is selected as the representative vector.

When the two representative vectors have been found, the process determines which representative vector provides a best match when the image patch is moved the distance and direction defined by the respective representative vector (step 508). This can, for example, be done by using two correlation windows, where one correlation window is centered around the origin of the vector, and the other is centered around the end point of the vector, and determining a minimum sum of absolute differences (SAD) for the pixels in the two correlation windows. Exactly how this is done will be described in further detail below, but for the purposes of FIG. 5A, the important result is that a best match is found for one of the two representative vectors. The process then selects as a candidate vector the representative vector that has the best match (step 510). The selected vector is subsequently projected down to the lowest resolution level, and the process ends. The best match vector represents the object vector, and the other vector represents a background vector.

The partitioning described above helps in resolving object/background vector discontinuities around smaller boundary details, such as a hood ornament on a moving car. The partitioning also works equally well on neighborhoods that do not contain any object boundaries, since most of the vectors will be in one cluster and the other cluster will just contain one or a few "outlier" vectors.

Returning now to FIGS. 1 and 2, after the filtered vector has been projected to the lowest resolution level, a set of update vectors (210a-210f) is generated and tested to find a minimum SAD at +/−1 pixel or +/−2 pixels from the old filtered projected motion vector (step 104). In FIG. 2, six update vectors (210a-210f) are illustrated, two for +/−1 pixel and two for +/−2 pixels in the horizontal direction, and two for +/−1 pixel in the vertical direction, since horizontal movement is generally greater than vertical movement. However, as the reader skilled in the art will realize, any number of update vectors can be generated and tested at any horizontal and/or vertical location in relation to the projected vector (205). In one implementation, a predicted camera vector is also projected down to 1:4 level. The camera vector will be discussed in further detail below.

In one implementation, the SAD is computed by letting the candidate vectors for an image patch, which all originate at the same image patch location in the source frame, point to different pixel locations in a target frame. For each candidate vector, a rectangular window is centered in the target frame on the pixel pointed to by the respective candidate vector. A corresponding rectangular window is centered in the source frame on the pixel where the candidate vectors originate. Then a pair wise absolute difference of the corresponding luma pixels in the two windows, that is, the pixels that have the same relative location within the two windows, is calculated. The sum of all the absolute differences is the SAD value. The SAD decreases as the window matching becomes better and is ideally zero when the pixels are identical. In practice, of course, due to noise and other factors, the best vector will have a non-zero SAD, but will have the minimum SAD of the vectors in the set of candidate vectors.

After the minimum SAD has been found the best vector, that is, the vector with the minimum SAD (210f) is selected and stored in memory (step 106). The process then examines whether there are any higher resolution levels (step 108). As was described above, in this example there are two higher resolution levels, so the process propagates the best vector (210f) is projected up to the 1:2 resolution level shown in FIG. 3 (step 110). Again, a set of update vectors (305a-305d) is generated around the best vector (210f) after it has been projected up to the 1:2 level (step 104). At this level, a second set of update vectors (310a-310d) is also generated around the old 1:1 filtered vector (205) projected down to the 1:2 resolution level. A new best vector (305a) is found, by computing the minimum SAD among all the update vectors, just like on the 1:4 resolution level. The best update vector is then selected and is stored in memory (step 106).

The process then examines again whether there are any higher resolution levels (step 108). At this point, there is one higher resolution level left in the resolution pyramid, so the process returns again to step 104, where the best vector (305a) from the 1:2 resolution level in FIG. 3 is filtered and projected up to the highest 1:1 resolution level shown in FIG. 4. Again, a set of update vectors (405a-405d) is generated around the projected and filtered best vector (305a) (step 104). At this level, a second set of update vectors (410a-410d) is also generated around the old 1:1 filtered vector. A third set of update vectors (420a-420d) is generated around a camera vector (415).

The camera vector describes a global movement of the contents of the frame, as opposed to the local vectors at each image patch location that are computed completely independently, and can therefore be used to aid in finding a better true motion vector. In several commonly occurring scenarios a motion vector resulting from camera movements at every location in a frame can be predicted quite easily with a simple model. For example, in the case of a camera lens panning across a distant landscape, all the motion vectors will be identical and equivalent to the velocity of the camera. Another scenario is when a camera lens zooms into an object on a flat surface, such as a picture on a wall. All the motion vectors then have a radial direction and increase from zero at the image center to a maximum value at the image periphery.

In one implementation, the process tries to fit a mathematical model to the motion vectors that have been computed using a least squares method. A good fit between the camera motion vectors and the mathematical model indicates that one of the scenarios discussed above likely is present, and the camera model predicted vector can then be used as an additional candidate vector in the next recursive hierarchical vector estimation step. Taking the camera vector into consideration is advantageous in that the recursive portion of the recursive hierarchical search is a local search approach, which may converge into a false local minimum instead of the true minimum. The camera predicted vector candidate can potentially help in avoiding detection of false local minima and direct the process towards a true minimum.

The new best vector (405d) is then found, just like on the 1:4 and 1:2 resolution levels (step 106) and is stored in memory. The process then examines again whether there are any higher resolution levels available (step 108). This time there are no higher resolution levels, so the process proceeds to step 112, where the best vector is selected and used for motion compensation, which completes the process for the current frame.

The above process is performed for all the 4×4 image patches of pixels in the frame, and based on the determined motion vectors, an interpolation of frames between a source frame and a target frame can be made, so that there is a minimal or no discrepancy between an expected image motion due to eye-tracking, and a displayed image motion.

As can be seen from the above discussion, the invention provides a smooth and accurate vector field and uses only a fairly small number of calculations. Furthermore, there is reduced convergence delay since due to the multiple levels of resolution. Fewer resolution levels can be used compared to conventional approaches, and vector errors in lower levels are not amplified due to resolution changes at higher resolution levels due to safeguarding by testing projected vectors at each resolution. Performing a temporal vector partitioning during the filtering of a motion vector determined for a previous image pair can help with resolving object-background vector discontinuities around smaller boundary details, for example, a hood ornament on a moving car, or similar types of details. At the same time the temporal vector partitioning does not adversely affect image areas that do not contain object boundaries. In this scenario the outlier vector (i.e., the incorrect vector) or vectors will be separated out from the good vectors, and so the procedure will still be of benefit.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Figure 6:
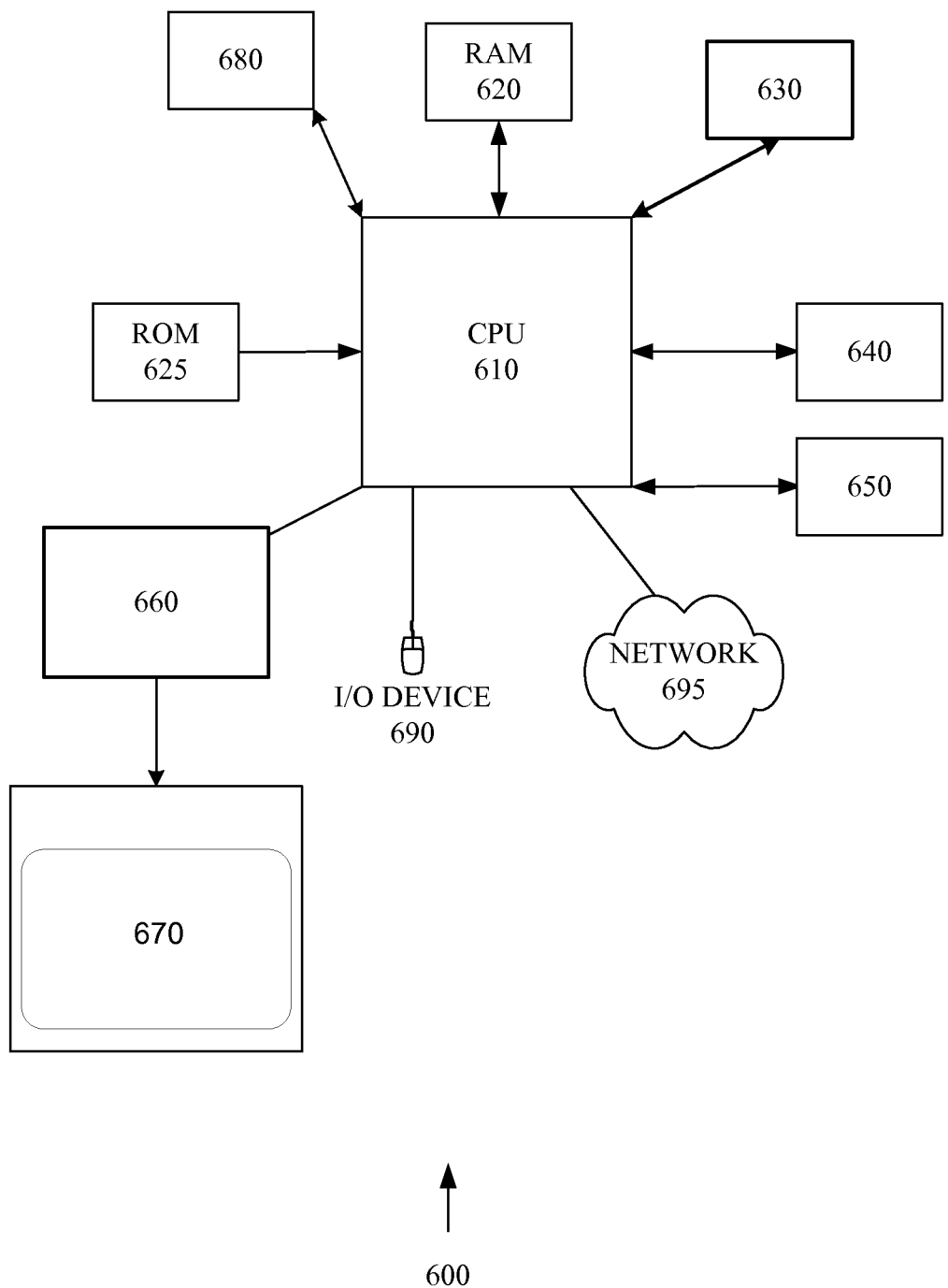
FIG. 6 illustrates a computer system employed to implement the invention.

FIG. 6 shows a computer system (600) employed to implement the invention. The computer system (600) is only an example of a graphics system in which the present invention can be implemented. The computer system (600 includes a central processing unit (CPU) (610), a random access memory (RAM) (620), a read only memory (ROM) (625), one or more peripherals (630), a graphics controller (660), primary storage devices (640 and 650), and a digital display unit (670). As is well known in the art, ROM acts to transfer data and instructions uni-directionally to the CPUs (610), while the RAM (620) is used typically to transfer data and instructions in a bi-directional manner. The CPUs (610) can generally include any number of processors. Both primary storage devices (640 and 650) can include any suitable computer-readable media. A secondary storage medium (680), which is typically a mass memory device, is also coupled bi-directionally to the CPUs (610) and provides additional data storage capacity. The mass memory device (680) is a computer-readable medium that can be used to store programs including computer code, data, and the like. Typically, the mass memory device (680) is a storage medium such as a hard disk or a tape which generally slower than the primary storage devices (640, 650). The mass memory storage device (680) can take the form of a magnetic or paper tape reader or some other well-known device. It will be appreciated that the information retained within the mass memory device (680), can, in appropriate cases, be incorporated in standard fashion as part of the RAM (620) as virtual memory.

The CPUs (610) are also coupled to one or more input/output devices (690) that can include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs (610) optionally can be coupled to a computer or telecommunications network, e.g., an Internet network or an intranet network, using a network connection as shown generally at (695). With such a network connection, it is contemplated that the CPUs (610) might receive information from the network, or might output information to the network in the course of performing the above-described method steps. The above-described devices and materials will be familiar to those of skill in the computer hardware and software arts.

The graphics controller (660) generates image data and a corresponding reference signal, and provides both to digital display unit (670). The image data can be generated, for example, based on pixel data received from the CPU (610) or from an external encode (not shown). In one embodiment, the image data is provided in RGB format and the reference signal includes the VSYNC and HSYNC signals well known in the art. However, it should be understood that the present invention can be implemented with data and/or reference signals in other formats. For example, image data can include video signal data also with a corresponding time reference signal.

A number of implementations of the invention have been described. Nevertheless, it will be understood that various modifications may be made without departing from the spirit and scope of the invention. For example in addition to the hierarchical and temporal vectors in the intermediate layers, the camera model generated vector projected down can also be used as a candidate for SAD computation. Accordingly, other embodiments are within the scope of the following claims.

The invention claimed is:

1. A method for performing temporal motion vector filtering in a digital video sequence, comprising:
   receiving a plurality of vectors representing potential motion vectors for an image patch including one or more of an object and a background;
   partitioning the plurality of vectors into a plurality of vector clusters comprising a first vector cluster and a second vector cluster;
   determining a first representative vector for the first vector cluster and a second representative vector for the second vector cluster;
   determining which of the first representative vector and the second representative vector most accurately reflects a displacement of the image patch between a first frame and a second frame of the digital video sequence; and
   selecting as a motion vector the representative vector that most accurately reflects the displacement of the image patch.

2. The method of claim 1, wherein said partitioning further comprises:
   determining a first seed vector and a second seed vector by identifying two vectors among the plurality of vectors that are furthest apart from each other; and
   for each other vector in the plurality of vectors:
      determining whether the vector is closer to one of the first seed vector and the second seed vector;
      associating the vector with the first vector cluster if the vector is closer to the first seed vector; and
      associating the vector with the second vector cluster if the vector is closer to the second seed vector.

3. The method of claim 1, wherein said partitioning further comprises:
   for each vector cluster, identifying which vector in the vector cluster has a minimum total distance from all the other vectors.

4. The method of claim 1, wherein the first vector cluster represents the object and the second vector cluster represents the background in the digital video sequence.

5. The method of claim 1, wherein each image patch includes a plurality of pixels.

6. The method of claim 1, wherein one vector in the plurality of vectors represents a previous motion vector originating at a first pixel and ending at a second pixel, and the other vectors in the plurality of vectors originate at the first pixel and end at pixels different from the second pixel in a horizontal direction or a vertical direction.

7. The method of claim 1, wherein the size of each image patch is 8 by 8 pixels.

8. The method of claim 1, wherein said determining which of the first representative vector and the second representative vector most accurately reflects a displacement of the image patch further comprises:
   for each representative vector:
      centering a first window on a pixel that forms an origin of the representative vector;
      centering a second window on a pixel that forms an end point of the representative vector; and
      determining a sum in absolute differences of luma values for the pixels in the first window and pixels at corresponding positions in the second window.

9. The method of claim 8, wherein the dimensions of the first and second windows are identical to the dimensions of the image patch.

10. A method for performing temporal motion vector filtering in a digital video sequence, comprising:
    receiving a plurality of vectors representing potential motion vectors for an image patch including one or more of an object and a background;
    partitioning the plurality of vectors into a plurality of vector clusters comprising a first vector cluster and a second vector cluster;
    determining a first representative vector for the first vector cluster and a second representative vector for the second vector cluster;
    determining which of the first representative vector and the second representative vector most accurately reflects a displacement of the image patch between a first frame and a second frame of the digital video sequence; and
    selecting as a motion vector the representative vector that most accurately reflects the displacement of the image patch,
    wherein determining which of the first representative vector and the second representative vector most accurately reflects a displacement of the image patch between a first frame and a second frame of the digital video sequence includes:
       for each representative vector:
          centering a first window on a pixel that forms an origin of the representative vector;
          centering a second window on a pixel that forms an end point of the representative vector; and
          determining a sum in absolute differences of luma values for the pixels in the first window and pixels at corresponding positions in the second window.

11. The method of claim 10, wherein the dimensions of the first and second windows are identical to the dimensions of the image patch.

12. The method of claim 10, wherein said partitioning further comprises:
    determining a first seed vector and a second seed vector by identifying two vectors among the plurality of vectors that are furthest apart from each other; and
    for each other vector in the plurality of vectors:
       determining whether the vector is closer to one of the first seed vector and the second seed vector;
       associating the vector with the first vector cluster if the vector is closer to the first seed vector; and
       associating the vector with the second vector cluster if the vector is closer to the second seed vector.

13. The method of claim 10, wherein said partitioning further comprises:
    for each vector cluster, identifying which vector in the vector cluster has a minimum total distance from all the other vectors.

14. The method of claim 10, wherein the first vector cluster represents the object and the second vector cluster represents the background in the digital video sequence.

15. The method of claim 10, wherein each image patch includes a plurality of pixels.

16. The method of claim 10, wherein one vector in the plurality of vectors represents a previous motion vector originating at a first pixel and ending at a second pixel, and the other vectors in the plurality of vectors originate at the first pixel and end at pixels different from the second pixel in a horizontal direction or a vertical direction.

17. The method of claim 10, wherein the size of each image patch is 8 by 8 pixels.

18. A non-transitory computer-readable storage medium having computer-executable instructions stored thereon that, in response to execution by at least one computing device, cause the at least one computing device to perform temporal motion vector filtering in a digital video sequence by:
 receiving a plurality of vectors representing potential motion vectors for an image patch including one or more of an object and a background;
 partitioning the plurality of vectors into a plurality of vector clusters comprising a first vector cluster and a second vector cluster, wherein partitioning comprises:
  determining a first seed vector and a second seed vector by identifying two vectors among the plurality of vectors that are furthest apart from each other;
  determining a first representative vector for the first vector cluster and a second representative vector for the second vector cluster;
  determining which of the first representative vector and the second representative vector most accurately reflects a displacement of the image patch between a first frame and a second frame of the digital video sequence; and
  selecting as a motion vector the representative vector that most accurately reflects the displacement of the image patch.

19. The computer-readable storage medium of claim 18, wherein partitioning further comprises:
 for each vector in the plurality of vectors other than the first seed vector and the second seed vector:
  determining whether the vector is closer to one of the first seed vector and the second seed vector;
  associating the vector with the first vector cluster if the vector is closer to the first seed vector; and
  associating the vector with the second vector cluster if the vector is closer to the second seed vector.

20. The computer-readable storage medium of claim 18, wherein partitioning further comprises:
 for each vector cluster, identifying which vector in the vector cluster has a minimum total distance from all the other vectors.

21. The computer-readable storage medium of claim 18, wherein the first vector cluster represents the object and the second vector cluster represents the background in the digital video sequence.

22. The computer-readable storage medium of claim 18, wherein each image patch includes a plurality of pixels.

23. The computer-readable storage medium of claim 18, wherein one vector in the plurality of vectors represents a previous motion vector originating at a first pixel and ending at a second pixel, and the other vectors in the plurality of vectors originate at the first pixel and end at pixels different from the second pixel in a horizontal direction or a vertical direction.

24. The computer-readable storage medium of claim 18, wherein the size of each image patch is 8 by 8 pixels.

25. The computer-readable storage medium of claim 18, wherein said determining which of the first representative vector and the second representative vector most accurately reflects a displacement of the image patch further comprises:
 for each representative vector:
  centering a first window on a pixel that forms an origin of the representative vector;
  centering a second window on a pixel that forms an end point of the representative vector; and
  determining a sum in absolute differences of luma values for the pixels in the first window and pixels at corresponding positions in the second window.

26. The computer-readable storage medium of claim 18, wherein the dimensions of the first and second windows are identical to the dimensions of the image patch.

* * * * *